United States Patent [19]

Kuznicki et al.

[11] Patent Number: 5,410,417
[45] Date of Patent: Apr. 25, 1995

[54] METHOD AND APPARATUS FOR CORRECTING AN ANGLE OF AN OPTICAL IMAGE FOR IMPROVING THE EFFICIENCY OF FACSIMILE ENCODING OF THE IMAGE

[75] Inventors: William J. Kuznicki, Coral Springs; Robert J. Schwendeman, Pompano Beach, both of Fla.

[73] Assignee: Motorola, Inc., Schaumburg, Ill.

[21] Appl. No.: 194,602

[22] Filed: Feb. 10, 1994

[51] Int. Cl.⁶ .................... H04N 1/04; H04N 1/21; H04N 1/41; H04Q 7/00
[52] U.S. Cl. .................... 358/426; 358/444; 358/488; 358/494; 382/46; 382/56; 379/58; 455/31.1
[58] Field of Search .............. 358/426, 444, 430, 432, 358/261.1, 261.2, 261.3, 474, 486, 494, 488; 382/46, 56; 379/58, 59; 455/33.1, 31.1

[56] References Cited

U.S. PATENT DOCUMENTS

5,001,766 3/1991 Baird ........................ 382/46

Primary Examiner—Scott A. Rogers
Attorney, Agent, or Firm—James A. Lamb

[57] ABSTRACT

A system controller (102) is for generating a compressed facsimile message in a radio communications system (100). The system controller (102) includes an image memory (203) for storing an optical image, means for image analysis (205), means for best scan angle identification (204), an image rotator (220), and a facsimile encoder (225). The means for image analysis (205) generates a long line analysis of a portion of the stored optical image using a scan angle. The means for best scan angle identification (204) identifies a best scan angle from one or more image analyses generated by the image analysis means (205). The image rotator (220) generates an aligned optical image by using the stored optical image and the best scan angle. The facsimile encoder (225) generates the compressed facsimile message from the aligned optical image.

17 Claims, 10 Drawing Sheets

FIG. 4 shows a diagram of a wristband antenna and an equivalent electrical schematic diagram which is useful in describing the operation of both the prior art wristband loop antenna, and the buffered loop antenna of the present invention. As previously described, the wristband loop antenna formed by bands A and B are inductive at the operating frequency, indicated schematically as L(b-x), the subscript denoting the plurality of inductances as the length of the loop is adjusted (x indicating position T1 to T7 and b indicating the reference end of the second band as shown in FIG. 4).

The wristband loop antenna couples to a receiver input and ground as shown, and is capacitively tuned, the capacitor shown schematically as Co. In the preferred embodiment of the present invention, capacitor Co couples between the receiver input and ground. The voltage delivered from the loop antenna operating in an electromagnetic field is shown schematically as the voltage source labeled E.

The operating frequency of the antenna may be determined by the following well known equation.

$F_{ant} = 1/2\pi \sqrt{L(b-x) C_o}$

From the previous description of FIGS. 2A and 2B, it was noted the inductance at tap T1, does not equal the inductance at the other taps. Thus $L(b-1) \neq L(b-2) \neq ... \neq L(b-7)$ where L(b-1), etc. represents the magnitude of the total inductance measure at each tap position. The total inductance of the loop antenna is the sum of the inductance of band A and band B, corrected for the differential inductance associated with varying the length of the loop in the adjustable zone.

It then follows, if Co is kept constant, such as when the capacitor is pretuned at one of the wristband lengths, then

METHOD AND APPARATUS FOR CORRECTING AN ANGLE OF AN OPTICAL IMAGE FOR IMPROVING THE EFFICIENCY OF FACSIMILE ENCODING OF THE IMAGE

FIELD OF THE INVENTION

This invention relates in general to encoding facsimile image messages, and in particular to a method for optimizing the image orientation to compress a facsimile image message.

BACKGROUND OF THE INVENTION

Selective call radio communication systems typically comprise a radio frequency transmitter/encoder (base station) that is accessed via a link to the Public Switched Telephone Network (PSTN) and a radio receiver (e.g., a selective call receiver or the like) that has at least one unique call address associated therewith. Operationally, the selective call receiver receives and decodes information transmitted from the base station, the information having an address and possibly a data or voice message. When the selective call receiver detects its address, it typically alerts the user and presents any received information.

Contemporary selective call radio communication systems such as paging systems employ messaging schemes that can deliver a voice, numeric, or alphanumeric messages to a user. The majority of paging systems transmit address and message information using a protocol such as GSC (Golay Sequential Code) or POCSAG (Post Office Code Standardization Advisory Group code). These protocol formats are well known to one of ordinary skill in the art of Paging systems. To originate a message or page, the base station or paging terminal is typically accessed via the PSTN from a rotary or dual-tone-multi-frequency (DTMF) telephone. As a voice message entry device, the telephone is acceptable but when graphical information or data needs to be entered, an alternative means of entry is desirable. Alternative entry devices such as computer terminals and custom entry devices work well when the originators can convey their information to the user in a concise, alphanumeric character based format. However, customer acceptance of these alternative entry devices has been lacking for reasons of expense and operational complexity. Facsimile machines are more universally accepted by originators because of their simplicity of operation and their ability to accept almost any paper document. However, the standard data messages generated by facsimile machines are very large, particularly when the information from the document to be transmitted consists of small, detailed items such as alphanumeric characters. The transmission of such large amounts of data, while convenient to the sending party, is very extensive in the use of radio spectrum resources, which typically have narrower data bandwidths than, for example PSTN networks. For example, typical new facsimile machines are capable of sending data at 9600 bits per second over a dial up phone link, while most POCSAG systems run at 1200 bits per second on the RF channels, though some operate at 512 bits per second and 2400 bits per second on the RF channels.

In summary, there is a need for information contained on a printed page to be transmitted to a selective call radio communication device without over-extending the conventional selective call signaling infrastructure.

SUMMARY OF THE INVENTION

Accordingly, in a first aspect of the present invention, a method used in a controller of a radio communication device for generating a compressed facsimile message includes the steps of storing an optical image of a scanned document into an image memory, analyzing the optical image, identifying a best scan angle, rotating the optical image, generating the compressed facsimile message, and transmitting the compressed facsimile message from a radio frequency transmitter. In the step of analyzing the optical image, the optical image is analyzed at one or more scan angles and an associated long line factor is generated for each scan angle analyzed. In the step of identifying a best scan angle, a best scan angle corresponding to one of the one or more scan angles is identified from the associated long line factors. In the step of rotating the optical image the optical image of the storing step is rotated to the best angle determined in the identifying step to derive an aligned optical image. In the step of generating the compressed facsimile message, the compressed facsimile message is generated by encoding the aligned optical image derived in the rotating step.

The step of analyzing the optical image includes the steps of scanning a portion of the optical image stored in the image memory at each of the one or more scan angles to detect contiguous groups of light picture elements, determining, from the contiguous groups of light picture elements, lengths of light line segments in the portion of the optical image, calculating the long line factor as a total quantity of light line segments, each of said light line segments having a length which exceeds a predetermined minimum length, and repeating said steps of scanning, determining, and calculating, for each of the one or more scan angles.

Accordingly, in a second aspect of the present invention, a method used in a controller of a radio communication device for generating a compressed facsimile message includes the steps of storing an optical image of a scanned document into an image memory, analyzing the optical image, identifying a best scan angle, rotating the optical image, generating the compressed facsimile message, and transmitting the compressed facsimile message. In the step of analyzing the optical image, the optical image is analyzed at one or more scan angles and an associated long line factor is generated for each scan angle analyzed. In the step of identifying a best scan angle, a best scan angle corresponding to one of the one or more scan angles is identified from the associated long line factors generated in the analyzing step. In the step of rotating the optical image, the optical image stored in the storing step is rotated to the best angle determined in the identifying step, to derive an aligned optical image. In the step of generating the compressed facsimile message, the compressed facsimile message is generated by encoding, in a facsimile encoder, the aligned optical image derived in the scanning step.

The step for identifying a best scan angle includes the steps of comparing, redefining, and two steps for repeating the process. In the step of comparing, the one or more long line factors determined in the analyzing step are compared with a predetermined continuation criteria. In the step of redefining, the one or more scan angles are redefined when the long line factors meet the continuation criteria. In the first step of repeating, the step of analyzing the one or more redefined scan angles is repeated when the long line factors meet the continuation criteria. In the second step of repeating, the step of rotating is repeated when the long line factors do not meet the continuation criteria.

Accordingly, in a third aspect of the present invention, a system controller which generates a compressed facsimile message in radio communications systems includes an image memory which stores an optical image, means for image analysis, means for best scan angle identification, an image rotator, and a facsimile encoder. The means for image analysis, which is coupled to the image memory, analyzes a portion of the stored optical image and generates a long line analysis using a scan angle. The means for best angle identification, which is coupled to the image analysis means, identifies a best scan angle from one or more image analyses generated by said image analysis means. The image rotator, which is coupled to the best scan angle analysis means and the image memory, generates an aligned optical image by using the stored optical image and the best angle. The facsimile encoder, which is coupled to the image memory, generates the compressed facsimile message from the aligned optical image.

The means for image analysis includes scanning means which scan a portion of the stored optical image at each of the one or more angles to detect contiguous groups of light picture elements, determining means which determine, from the contiguous groups of light picture elements, lengths of light line segments in the portion of the stored optical image, and calculating means which calculate the long line factor as a total quantity of light line segments, each of said light line segments having a length which exceeds a predetermined minimum length.

Accordingly, in a fourth aspect of the present invention, a system controller which generates a compressed facsimile message in radio communications systems includes an image memory which stores an optical image, means for image analysis, means for best scan angle identification, an image rotator, and a facsimile encoder. The means for image analysis, which is coupled to the image memory, analyzes a portion of the stored optical image and generates a long line analysis using a scan angle. The means for best angle identification, which is coupled to the image analysis means, identifies a best scan angle from one or more image analyses generated by said image analysis means. The means for best scan angle identification compares one or more of the long line factors with a predetermined continuation criteria and redefines the one or more scan angles when the long line factors meet the continuation criteria. The image rotator, which is coupled to the best scan angle analysis means and the image memory, generates an aligned optical image by using the stored optical image and the best angle. The facsimile encoder, which is coupled to the image memory, generates the compressed facsimile message from the aligned optical image.

Accordingly, in a fifth aspect of the present invention, a method used in a controller of a radio communication device for generating a compressed facsimile message includes the steps of storing an optical image of a scanned document into an image memory, analyzing the optical image, identifying a best scan angle, rotating the optical image, generating the compressed facsimile message, and transmitting the compressed facsimile message from a radio frequency transmitter. In the step of analyzing the optical image, the optical image is analyzed at one or more scan angles and an associated long line factor is generated for each scan angle analyzed. In the step of identifying a best scan angle, a best scan angle corresponding to one of the one or more scan angles is identified from the associated long line factors. In the step of rotating the optical image the optical image of the storing step is rotated to the best angle determined in the identifying step to derive an aligned optical image. In the step of generating the compressed facsimile message, the compressed facsimile message is generated by encoding the aligned optical image derived in the rotating step.

The step of analyzing the optical image includes the steps of scanning a portion of the optical image stored in the image memory at each of the one or more scan angles to detect contiguous groups of light picture elements, determining, from the contiguous groups of light picture elements, lengths of light line segments in the portion of the optical image, calculating the long line factor as a total quantity of light line segments, each of said light line segments having a length which exceeds a predetermined minimum length, and repeating said steps of scanning, determining, and calculating, for each of the one or more scan angles.

The step for identifying a best scan angle includes the steps of comparing, redefining, and two steps for repeating the process. In the step of comparing, the one or more long line factors determined in the analyzing step are compared with a predetermined continuation criteria. In the step of redefining, the one or more scan angles are redefined when the long line factors meet the continuation criteria. In the first step of repeating, the step of analyzing the one or more redefined scan angles is repeated when the long line factors meet the continuation criteria. In the second step of repeating, the step of rotating is repeated when the long line factors do not meet the continuation criteria.

BRIEF DESCRIPTION OF THE DRAWING

FIG. 9 shows the document of FIG. 3, FIG. 4, FIG. 7, and FIG. 8, electronically rotated in accordance with a preferred embodiment of the present invention.

DETAILED DESCRIPTION OF THE INVENTION

Figure 1:
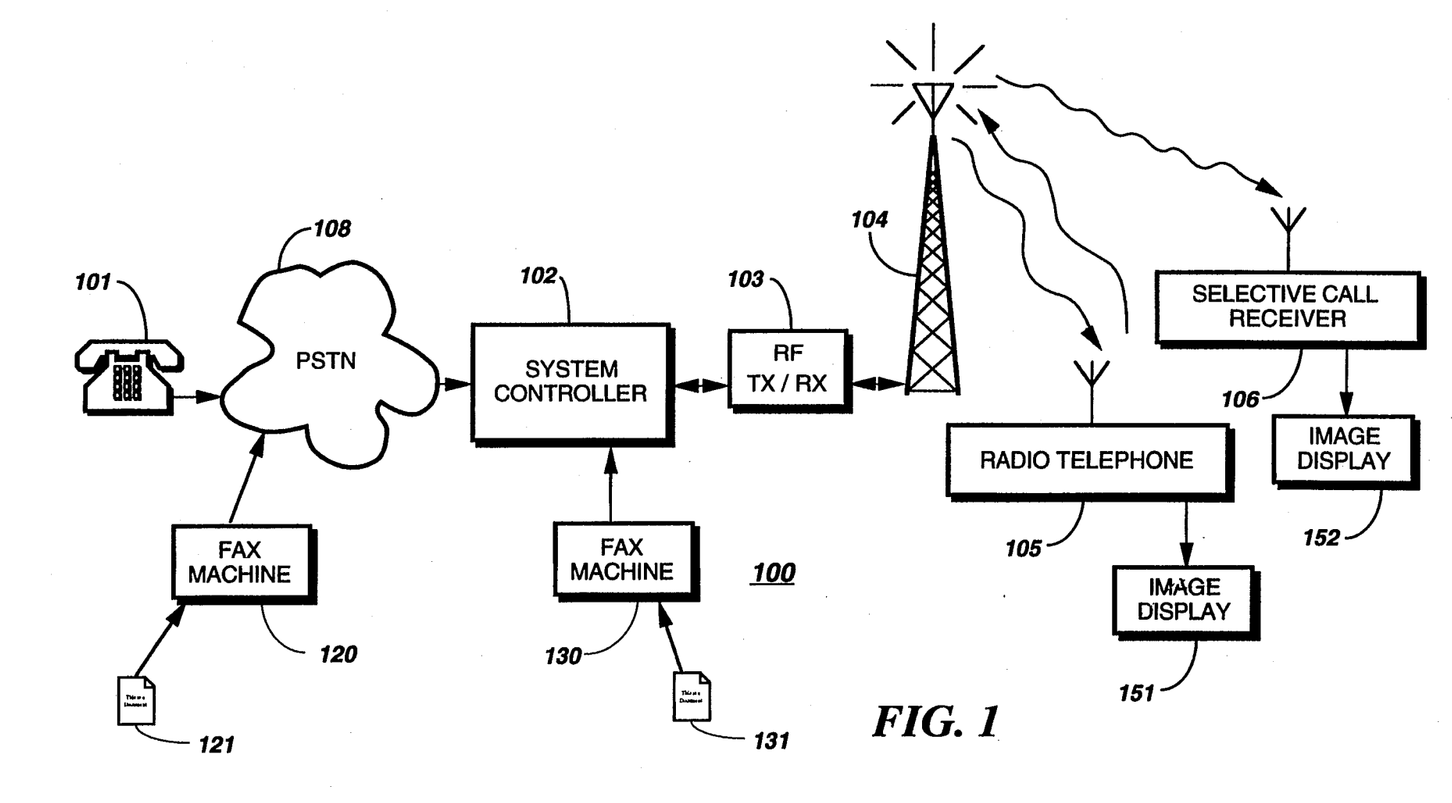
FIG. 1 shows an electrical block diagram of a radio communication system in accordance with the preferred embodiment of the present invention.

Referring to FIG. 1, an electrical block diagram of a radio communication system 100 is shown in accordance with the preferred embodiment of the present invention. The radio communication system 100 comprises message input devices, such as a telephone 101 and a facsimile machine 120 connected by a conventional public switched telephone network (PSTN) 108 to a system controller 102, and a facsimile machine 130 connected directly by a cable to the system controller 102. The facsimile machines optically scan documents 121 and 131, encode the optical image into standard CCITT (The International Telegraph and Telephone Consultive Committee) group 3 or group 4 facsimile messages which are coupled to the system controller 102. The system controller 102 oversees the operation of a radio frequency transmitter/receiver 103 and encodes and decodes inbound and outbound telephone addresses into formats that are compatible with land line message switch computers and personal radio telephone addressing requirements, such as cellular message protocols. The system controller 102 can also function to encode paging messages for transmission by the radio frequency transmitter/receiver 103. The system controller 102 can further function to receive a standard group 3 or group 4 facsimile message and encode the message as described below for transmission by the radio frequency transmitter/receiver 103. Telephony signals, facsimile messages, and data messages are transmitted from and received by at least one antenna 104 coupled to the radio frequency transmitter/receiver 103. The telephony signals and facsimile messages are transmitted to a communication receiver, such as a personal radio telephone 105. The personal radio telephone 105 is capable of decoding a facsimile message and is coupled to an image display 151 for displaying the images of documents 121 and 131. The radio frequency transmitter/receiver 103 may also be used to transmit data paging messages and facsimile messages to an optional portable receiving device 106. The portable receiving device 106 is capable of decoding the facsimile message and is coupled to an image display 152 for displaying the images of documents 121 and 131.

It should be appreciated that the PSTN 108 could alternatively be a Integrated Services Digital Network (ISDN) or other digital network, such as Internet.

It should be noted that the system controller 102 is capable of operating in a distributed transmission control environment that allows mixing cellular, simulcast, master/slave, or other coverage schemes for providing reliable radio signals within a geographic area. Moreover, as one of ordinary skill in the art would recognize, the telephonic and radio communication functions may reside in separate system controllers that operate either independently or in a networked fashion.

Figure 2:
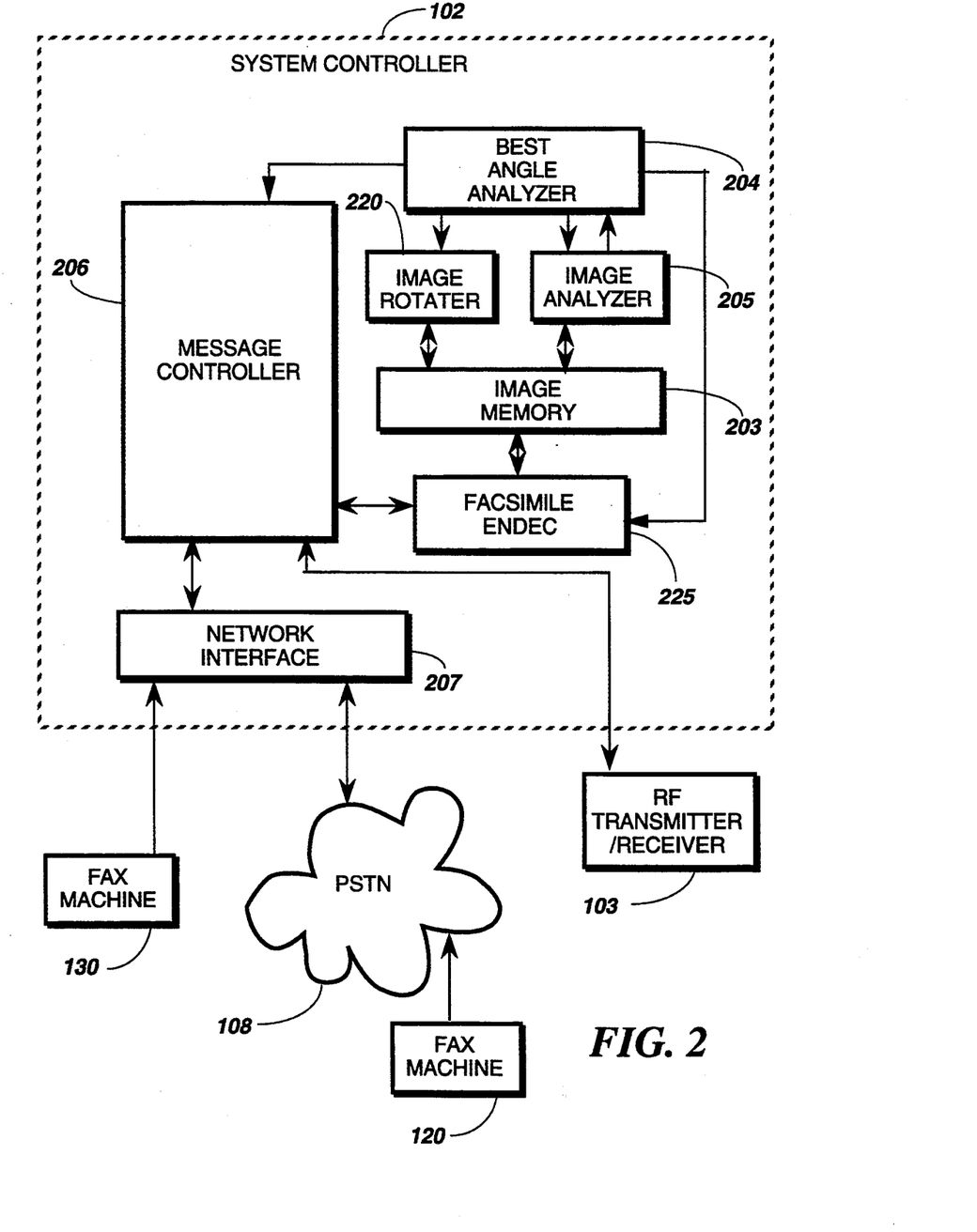
FIG. 2 shows an electrical block diagram of the system controller, for use in the radio communication system of FIG. 1, in accordance with a preferred embodiment of the present invention.

Referring to FIG. 2 an electrical block diagram of the system controller 102, for use in the radio communication system 100 of FIG. 1, is shown in accordance with a preferred embodiment of the present invention.

The source document 121 as shown in FIG. 1 is read (scanned) by the facsimile machine 120, which quantizes the image into picture elements and encodes a CCITT (Consultative Committee on International Telegraph and Telephone) group 3 or group 4 facsimile message for transmission to the system controller 102. The facsimile machine 120 need not be located at the same physical site as the system controller 102, and in fact can be replaced by a number of devices such as a computer, a conventional document scanner, or possibly a dedicated message entry device, each being capable of communicating at least a facsimile message to the system controller 102 via the PSTN network 108. Alternatively, a document 131 is read by the facsimile machine 130, as shown in FIG. 1, which transmits a CCITT group 3 or group 4 message and which is connected to the system controller 102 as shown in FIG. 2, through a high speed local data network, or a direct cable connection. The system controller 102 operates to receive CCITT group 3 and group 4 facsimile transmissions originated from the facsimile machines 130 or 120, and associates each facsimile message with at least one selective call address selected by an originator. Three scenarios for originator entry of facsimile information for transmission to the personal radio telephone 105 and the portable receiving device 106 follow.

In a first scenario, an originator wanting to send a facsimile to the facsimile capable personal radio telephone 105 or portable receiving device 106 (hereinafter called the subscriber device 105 or 106) calls the subscriber device's service provider using a conventional telephone and enters the subscriber device's code number or phone number (these numbers are assigned by the service provider to correspond to the actual coded addresses of the subscriber device 105 or 106), from a telephone key pad. The service provider maintains a list of facsimile capable code and phone numbers, and upon receiving an entered code or phone number which matches one of the facsimile capable code or phone numbers initiates a procedure to receive a conventional facsimile message through the PSTN 108. The originator then puts the conventional facsimile machine 120 into an on-line mode and transmits a document to the system controller 102 at the service provider. After receipt of the facsimile message, the system controller 102 encodes and transmits a data message to the targeted subscriber device. The method, protocol, and apparatus required for the transmission of the data message will be discussed in detail below.

In a second scenario, an originator wanting to send a facsimile to a subscriber device uses a conventional facsimile machine that has a feature allowing the storage of a list of predetermined service provider phone numbers and subscriber code or phone numbers. In this scenario, a facsimile message is originated by recalling the phone number of the service provider and the code or phone number of the subscriber from a memory in the originating facsimile machine. The facsimile machine dials the phone number of the service provider, thereby establishing a connection with the service. The subscriber device's code number is represented by an alias or nickname that points to a predetermined memory location in the facsimile machine containing the code or phone number of the subscriber. After successfully connecting with the service provider, the facsimile machine transmits the code or phone number of the subscriber device. When this is successfully completed, the facsimile machine transmits the document to the system controller 102.

In a third scenario, the facsimile machine 130 is closely coupled to the system controller 102 as shown in FIG. 1 and FIG. 2. This scenario includes all the capabilities discussed above and further improves on their performance by not requiring the PSTN network 108 to originate a facsimile transmission. In this scenario, the facsimile message input machine 130 can be directly connected to the system controller 102 via a high speed network (e.g., per Electronics Industry Association (EIA) specification RS-232, Institute of Electrical and Electronic Engineers (IEEE) Standard 802.3, or the like), thus resulting in extremely high message throughput.

The system controller 102 comprises a network interface 207, a message controller 206, a facsimile endec (encoder/decoder) 225, an image memory 203, an image analyzer 205, an image rotator 220 and a best angle analyzer 204. The network interface 207 is coupled to at least the facsimile machine 130 and the PSTN for the receipt of facsimile messages, and may be connected to other serial devices (not shown). The network interface 207 is also coupled to the message controller 206 for the manipulation and routing of the received facsimile messages. The message controller 206 is coupled to the radio frequency transmitter/receiver 103 for the communication of facsimile messages to the subscriber devices 105 and 106, as well as the communication of voice and data messages to and from to the subscriber devices 105 and 106. The message controller 206 is further coupled to the facsimile endec 225 for the encoding and decoding of facsimile messages. The facsimile endec 225 device is coupled to the image memory 203 which stores and retries optical images for facsimile reception and transmission. The image memory 203 is coupled to the image rotator 220 which rotates the optical images, and is further coupled to the image analyzer 205, for the analysis of optical images. The image analyzer 205 is coupled to the best angle analyzer 204, from which an angle value is received, and to which the image analyzer 205 returns an analysis value. The best angle analyzer 204 is coupled to the facsimile endec 225, for commanding an encoding of an optical image, and to the message controller 206, for indicating the completion of an optical image optimization and transmission of a compressed facsimile message to one or more subscriber devices 105 and 106.

The system controller 102 is preferably a model E09-PED0552 PageBridge ® paging terminal manufactured by Motorola, Inc., of Schaumburg Ill., modified with special firmware elements in accordance with a preferred embodiment of the present invention, as will be described below. The network interface 207, the message controller 206, the facsimile endec 225, the image memory 203, the image analyzer 205, the image rotator 220 and the best angle analyzer 204 are preferably implemented within portions of the model E09PED0552 PageBridge ® paging terminal which include, but are not limited to those portions providing a program memory, a central processing unit, input/output peripherals, and a random access memory. The system controller alternatively could be a MPS2000 ® paging terminal.

When a message is received from the network interface 207, the message controller 206 determines from the content of the message whether or not the message is a facsimile message. When the received message is a facsimile message, which can be received as a standard or enhanced CCITT group 3, group 4 message, the message controller 206 commands the facsimile endec 225 to decode the facsimile message into an optical image comprising bits grouped into scan lines. The bits represent the light and dark picture elements which have been scanned from a document by the facsimile machine 120 or 130, on a line by line basis.

In accordance with the preferred embodiment of the present invention, an example is used of an A4 size (approximately 21.0 by 29.7 cm) English text document scanned at normal scanning resolution by the facsimile machine 120 or 130 and encoded in a CCITT group 3 message. The optical scanning operation performed by an optical scanner in the facsimile machine 120 or 130 results in an image having a picture element density of approximately 100 (vertical) by 200 (horizontal) dots per inch (dpi) or 40 by 80 dots per centimeter. The document image contains 1145 horizontal scan lines each having an average of 65 dark and light line segments per line, where a segment consists of one or more contiguous identical picture elements (i.e., either light or dark). Standard CCITT group 3 encoding of an image basically converts the length of each segment into a code word from two to thirteen bits long. The average code word length for this exemplary document is approximately four bits. The CCITT group 3 encoded message in this example is approximately 372,000 bits. To transmit this message, assuming a serial protocol with no error correction, would take 310 seconds at 1200 baud. This transmission time of approximately 5 minutes is impractical with the economics of typical radio systems presently operated by service providers. When the size of the document is restricted, in this example, to one quarter of an A4 size page the standard group 3 message reduces to approximately 93,000 bits. The use of a CCITT group 3 enhancement, known as a relative addressing (read) code to one of ordinary skill in the art, further reduces the message length having a transmission time which is approximately 30 to 45 seconds at 1200 bits per second. Even this transmission time is such that further reduction of the message length, and the resulting transmission time, is still highly desirable.

In accordance with the preferred embodiment of the present invention, the facsimile message encoding of the optical image of the example document, which is encoded with CCITT group 3 coding for transmission through the PSTN 108, is received by the system controller 102 and decoded by the facsimile endec 225, and the resulting optical image is stored, under control of the message controller 206, into the image memory 203. It will be appreciated that, when the message is scanned at the facsimile machine 120 or 130, the document, in this example, is not aligned accurately and therefore the document is scanned with an angular error with respect to the direction of the horizontal scanning used by the optical scanner in the facsimile machine 120 or 130. Equally, or in conjunction with the angular error caused during the scanning operation at the facsimile machine 120 or 130, the document which is scanned already contains an angular error (for example, because it is a document that was received by facsimile). The best angle analyzer 204 controls the image analyzer 205 to perform a scan line analysis of a portion of the stored optical image at one or more angles, determining, by long line factors returned to the best angle analyzer 204 from the image analyzer 205, a best angle. The best angle analyzer 204 further controls the image rotator 220 to electronically rotate the image stored in the image memory 203 by the amount of the best angle and store the rotated image into the image memory 203. The best angle analyzer 204 further controls the facsimile endec 225 to encode the facsimile message. The best angle analyzer 204 further provides an indication to the message controller 206 that an optimized facsimile message is available for transmission to the subscriber device 105 or 106.

Figure 3:
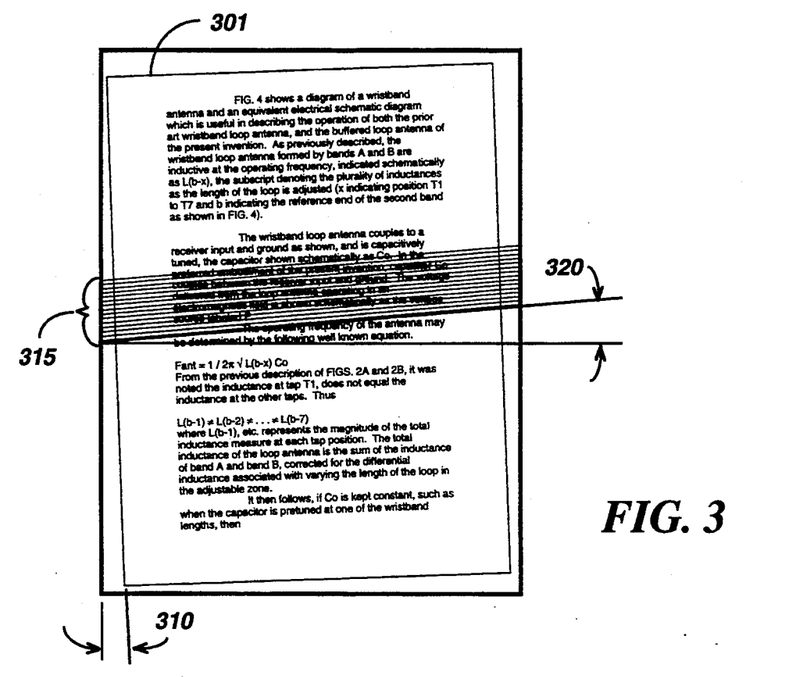
FIG. 3, FIG. 4 each illustrate a scan line analysis of a portion of an optical image of a document having a angular scan error, at an analysis angle of +2.5, and −2.5° respectively, in accordance with a preferred embodiment of the present invention.
Figure 4:
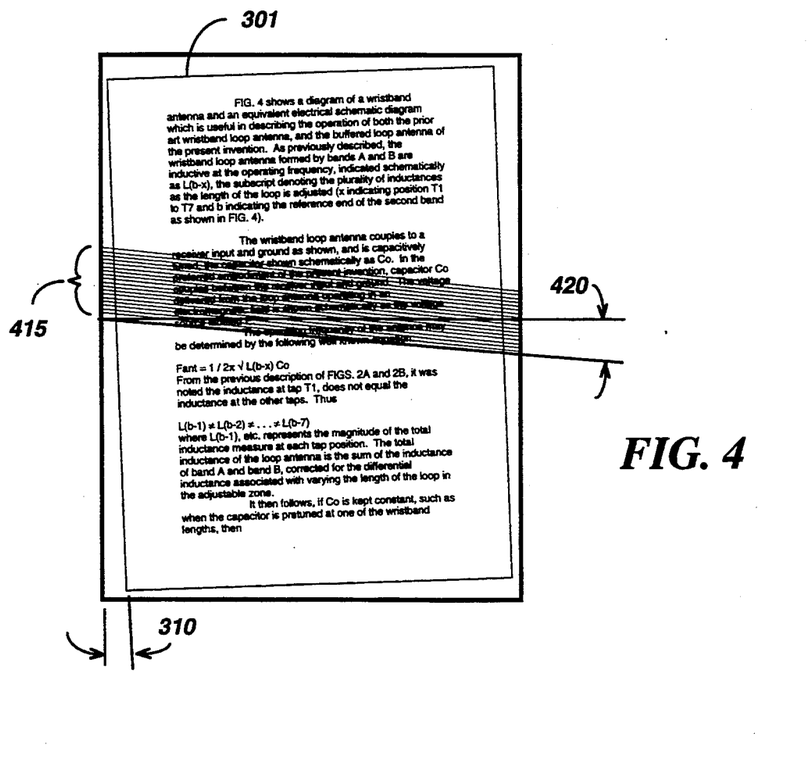

Referring to FIG. 3 and FIG. 4, a scan line analysis of a portion of an optical image of a document 301 is shown, at an analysis angle of +2.5°, and −2.5° respectively, in accordance with a preferred embodiment of the present invention. The document in FIG. 3 and FIG. 4 is an A4 size document as in the above example, representing substantially any text document of similar size, scanned by an optical scanner and having a scan angular error. In FIG. 3 and FIG. 4, the scan angular error 310 is 1.35°. The best angle analyzer 204 controls the image analyzer 205 to perform an analysis at a first angle 320 of +2.5°, which is shown in FIG. 3, and a second angle 420 of −2.5°, which is shown in FIG. 4 (the angles are exaggerated for clarity). The scans are performed electronically, from the information stored in the image memory 203, using a similar technique as is used to electronically rotate an image stored in a memory, which technique is well known to one of ordinary skill in the art, except that only a portion of the image, instead of the entire image, is scanned. In the example shown in FIG. 3 and FIG. 4, a portion of the document is scanned by one hundred scan lines 315 and 415 (the number of lines actually shown in FIG. 3 is reduced for clarity). The one hundred scan lines 315 and 415 are centered at the left edge of the optical image, are scanned at the respective angles of +2.5° and −2.5° from a horizontal scan, and are spaced at the standard sparing for group 3 scanning at standard density (approximately 100 lines per inch or 40 lines per centimeter vertical scan line density), although other spacings (e.g., the optional approximately 200 lines per inch or 80 lines per centimeter vertical scan line density) could be used equally well.

Figure 5:
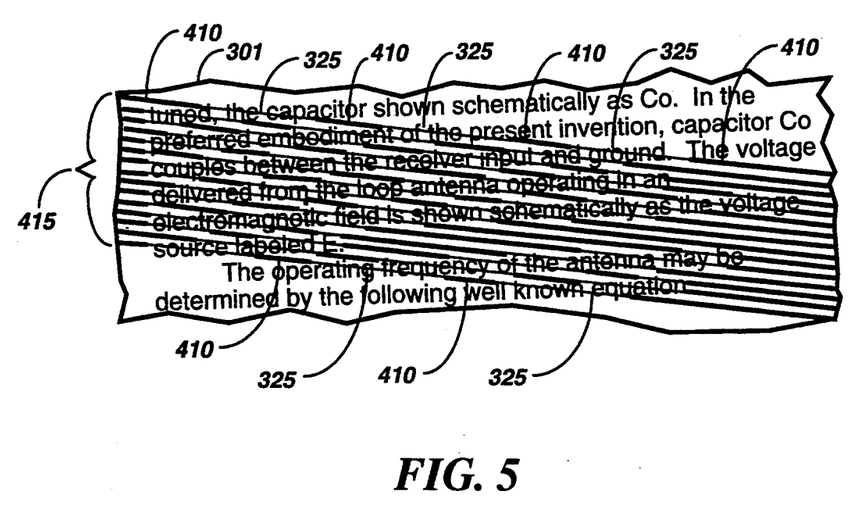
FIG. 5 shows an enlarged portion of the image scan line analysis of FIG. 3, in accordance with the preferred embodiment of the present invention.

Referring to FIG. 5, an enlarged portion of the image scan line analysis of FIG. 3, is shown, in accordance with the preferred embodiment of the present invention. When the document 301 is scanned at a test angle, which is −2.5° in this example, the image analyzer counts the total number of long lines, which are light line segments exceeding a predetermined minimum length, in the one hundred scan lines 415. The long lines 410 are shown by darkened portions of the scan lines 415 in FIG. 5. In the example of FIG. 5, the predetermined minimum length is 60 picture elements, which is approximately three average character widths for the document 301 used in this example. The total number of long lines is the long line factor (LLF), which results from the scan line analysis at a test angle of −2.5°. In the example of FIG. 5, there are approximately 427 such long lines (represented by 64 long lines within the 15 scan lines actually shown in FIG. 5), so the long line factor is 427 at −2.5°. The number of shorter light segments, which are all included in the undarkened segments 325 of the scan lines 415, is approximately 6000, due to the nature of the text content of the exemplary document 301.

Figure 6:
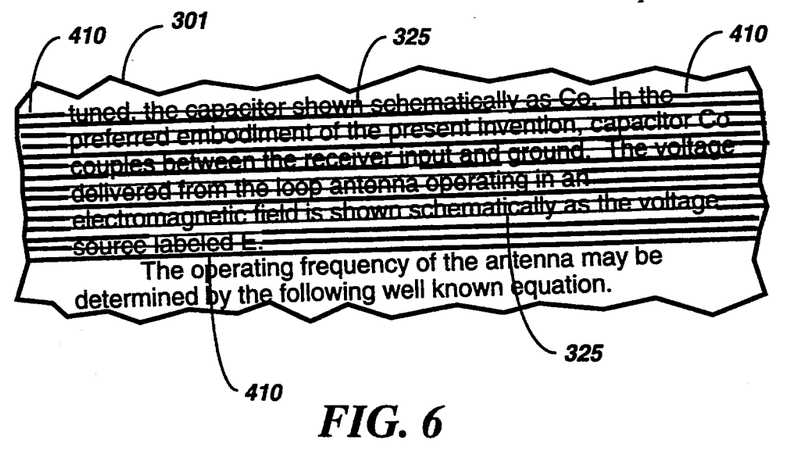
FIG. 6 shows an enlarged portion of an image scan line analysis of a document having no alignment error, in accordance with the preferred embodiment of the present invention.

Referring to FIG. 6, an enlarged portion of an image scan line analysis of an image of the document 301 having no scan angular error is shown, in accordance with the preferred embodiment of the present invention. In the example of FIG. 6, the predetermined minimum length of the long lines is also 60 picture elements, or approximately three characters. In the example of FIG. 6, there are approximately 221 such long lines (represented by 31 long lines within the 15 scan lines actually shown in FIG. 5), so the long line factor is 221 when there is no scan angular error. The number of shorter light segments is approximately the same (6000) as in FIG. 5 due to the content of the document. It will be appreciated that the long line factor is minimized when, in text documents of this or similar type, the scanning is aligned to the lines of text. In the particular example given in FIG. 5 and FIG. 6, the reduction of line segments which must be encoded is 427−221=206, which is approximately a 3% reduction. The amount of line segment reduction for a typical variety of text documents is estimated to range from negligible to 10%, but line segment reduction greater than 90% is possible for a document having a particular graphical image (consisting of horizontal white bars 0.04 inches high separated by narrow black bars 0.03 inches high, for the parameters used in the example for the preferred embodiment of the present invention), with an angular error of 45°. No line segment reduction is generally achieved when the image is scanned with no angular error, unless the original image happens to have a higher vertical light line content than horizontal light line content. Typically, larger reductions are achieved with larger angular errors, up to a limit determined by the predetermined parameters chosen for the implementation of the process, and the nature of the image on the document. It will be appreciated that, because the CCITT group 3 and group 4 coding process basically converts each segment length to a code word, the compression achieved in the example described above is 3% and that compressions of more than 90% are achievable.

Figure 7:
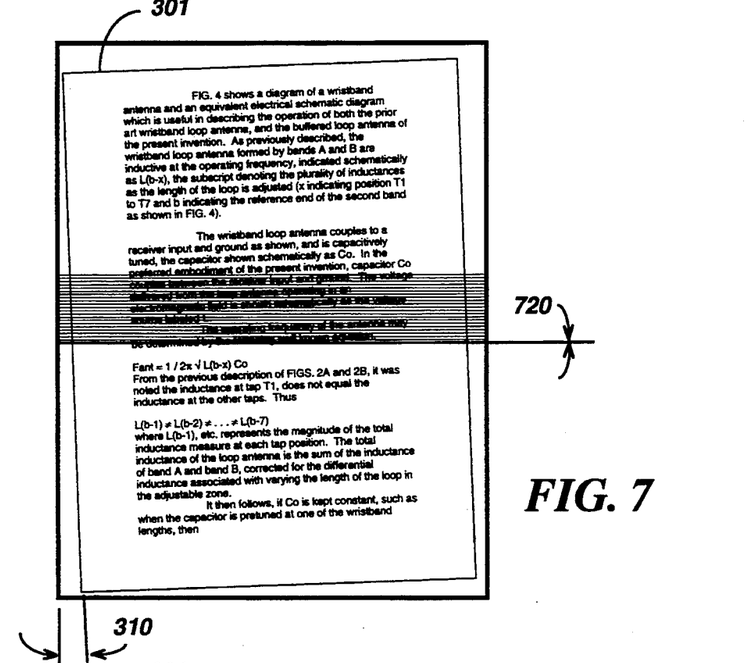
FIG. 7, FIG. 8 each illustrate a scan line analysis of a portion of an optical image of a document, at an analysis angle of 0°, and +1.25° respectively, in accordance with a preferred embodiment of the present invention.
Figure 8:
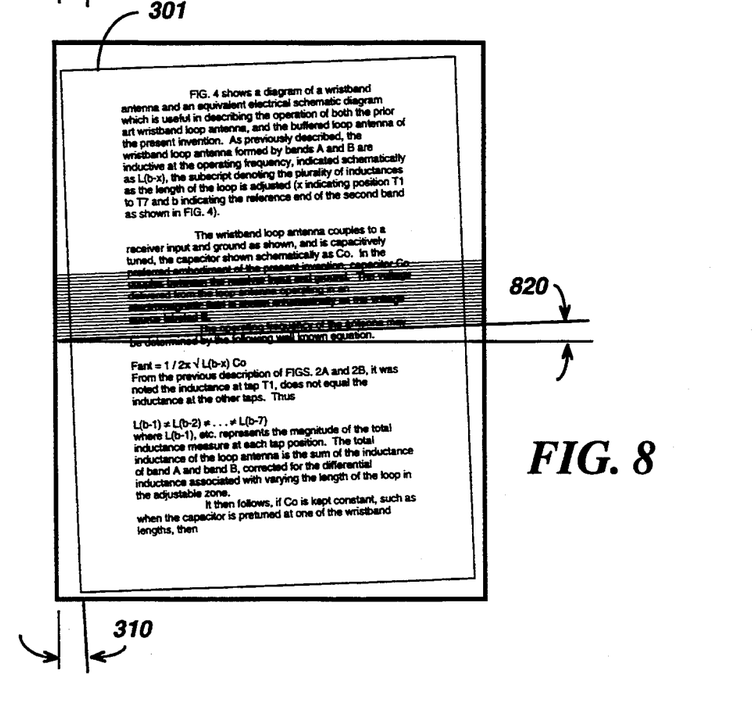

FIG. 7, and FIG. 8 each illustrate a scan line analysis of a portion of the optical image of the document 301, at an analysis angle of 0°, and +1.25° respectively, in accordance with a preferred embodiment of the present invention. The best angle analyzer 204, after obtaining LLF's as described above at +2.5° and −2.5°, controls the image analyzer 205 to return an LLF factor at an angle 720 halfway between the angles 320 and 420 (FIG. 3 and FIG. 4) initially used. The angle 720 is 0°, as shown in FIG. 7. It will be appreciated that the value of the long line factors at angles 320, 420, and 720 (+2.5°, −2.5° and 0°) will be smallest at angle 320 (2.5°) and largest at angle 420 (−2.5°), in this example. The best angle analyzer 204 selects the angles 320 (FIG. 3) and 720 (FIG. 7) associated with the two smallest LLF's, and determines an angle 820 halfway between the two smallest angles, which is +1.25° in this example, as shown in FIG. 8. The analysis of LLF's is performed for the angles 820, 720 and 320, with the resultant selection of the angles 320 and 820 having the two smallest LLF's. The process is repeated and ends, in this example, when the two smallest LLF's are less than 2 counts apart, as will be more fully described below. In this example, a best angle of 1.25° is determined by the best angle analyzer 204. The best angle analyzer 204 controls the image rotator 220 to electronically rotate the image in the image memory 203 through an angle equal and opposite in direction to the best angle, in a manner well known to one of ordinary skill in the art, and stores the rotated image into the image memory 203, under the control of the best angle analyzer 204. The rotated image is an image having a substantially reduced angular scan error, as shown in FIG. 9, wherein the angular scan error 920 is less than 0.1°. The rotated image is encoded by the facsimile endec 225, in a standard or enhanced group 3 or group 4 CCITT code, and transmitted under the control of the message controller 206.

It will be appreciated that codes other than the group 3 or group 4 CCITT codes may alternatively be used in the facsimile endec 225 for encoding the facsimile transmission for use in the radio communication system, and that substantially any coding method will benefit from the rotation of the image, because the redundancy in the scan line information is typically improved by the rotation. The improvement is typical for both text and graphic documents, being most significant for documents having information oriented substantially in a linear orientation.

Figure 10:
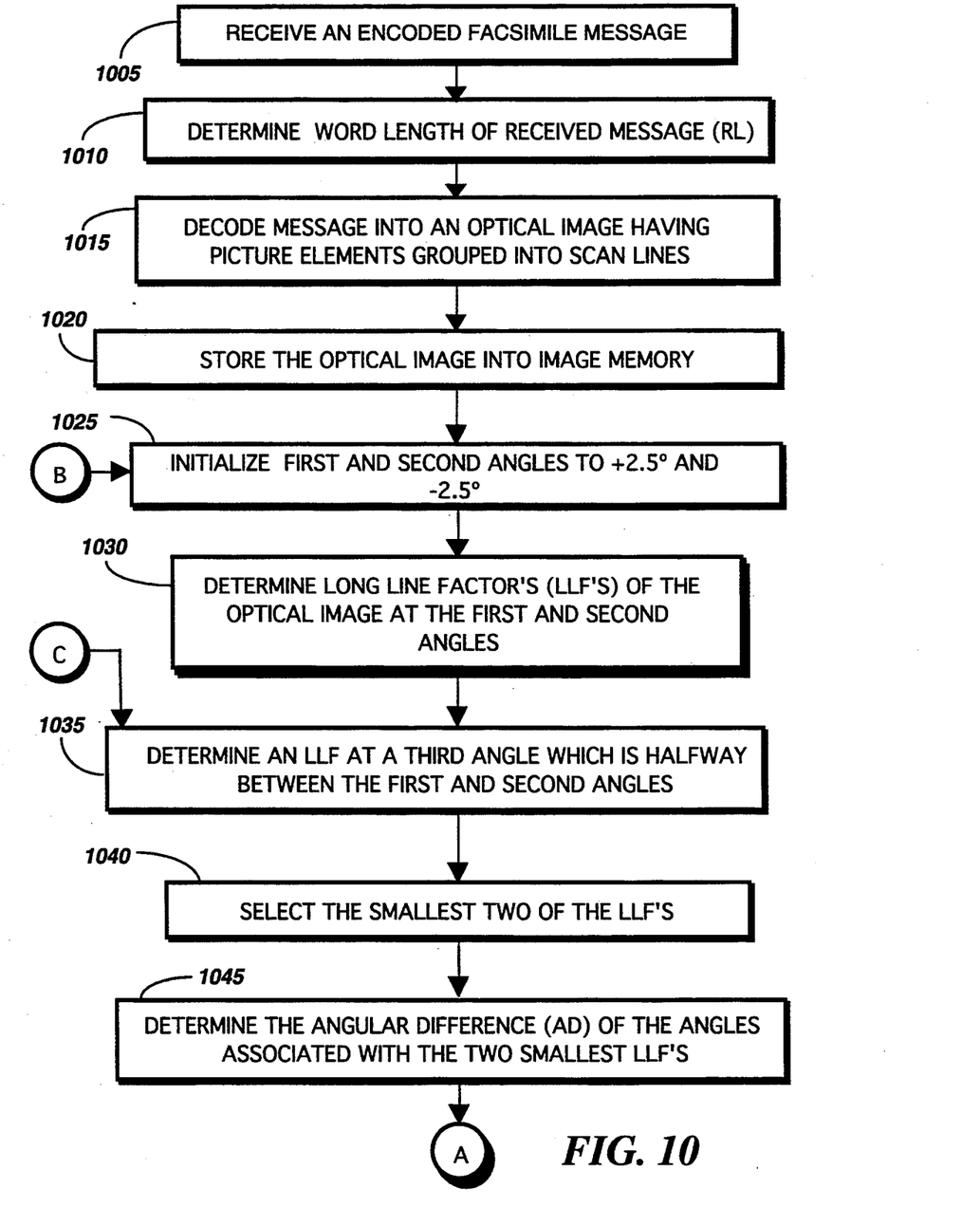
FIG. 10, FIG. 11 and FIG. 12 are flow charts showing a method for generating and transmitting a compressed facsimile message in the radio communication system of FIG. 1, in accordance with the preferred embodiment of the present invention.
Figure 11:
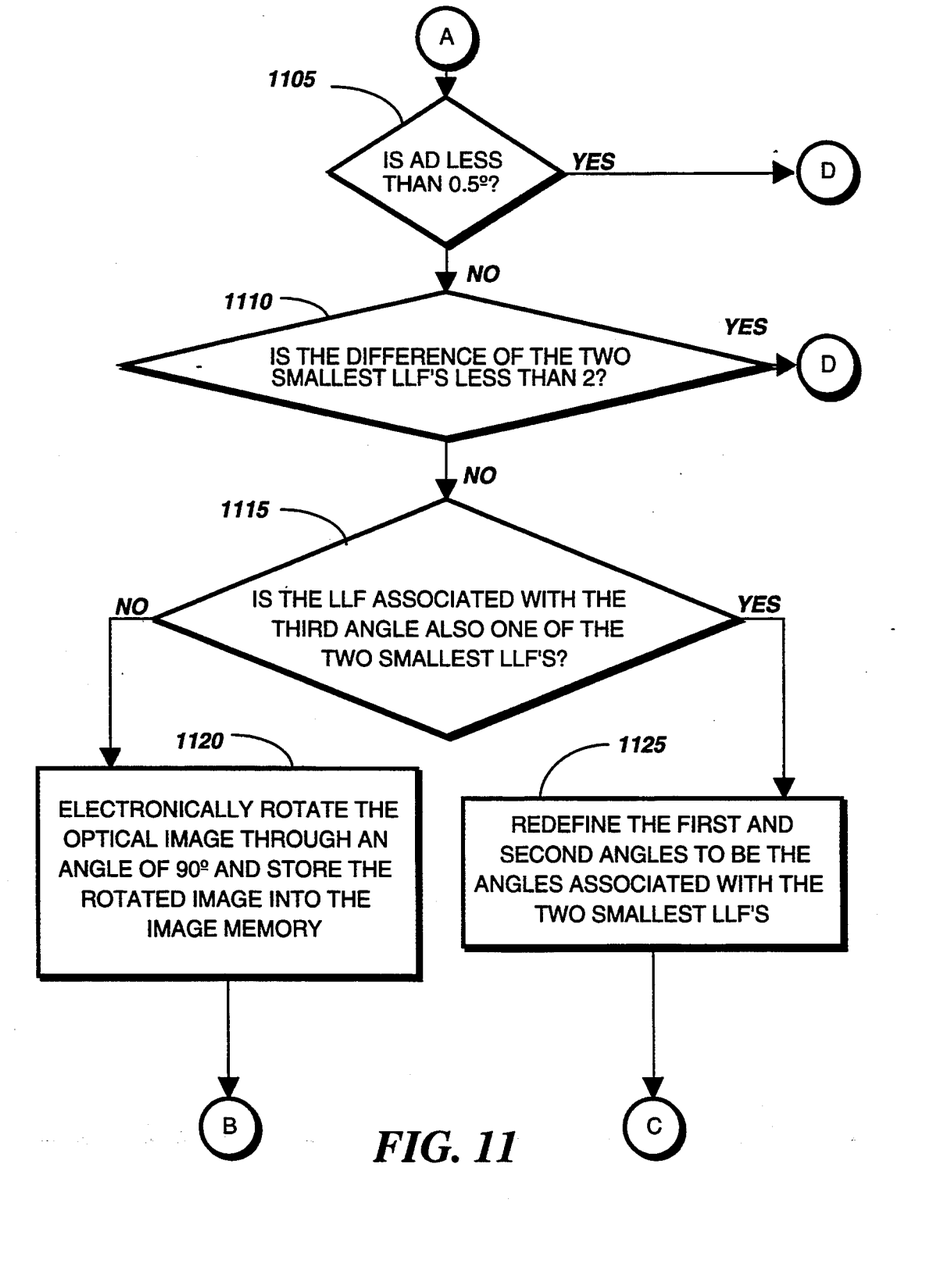
Figure 12:
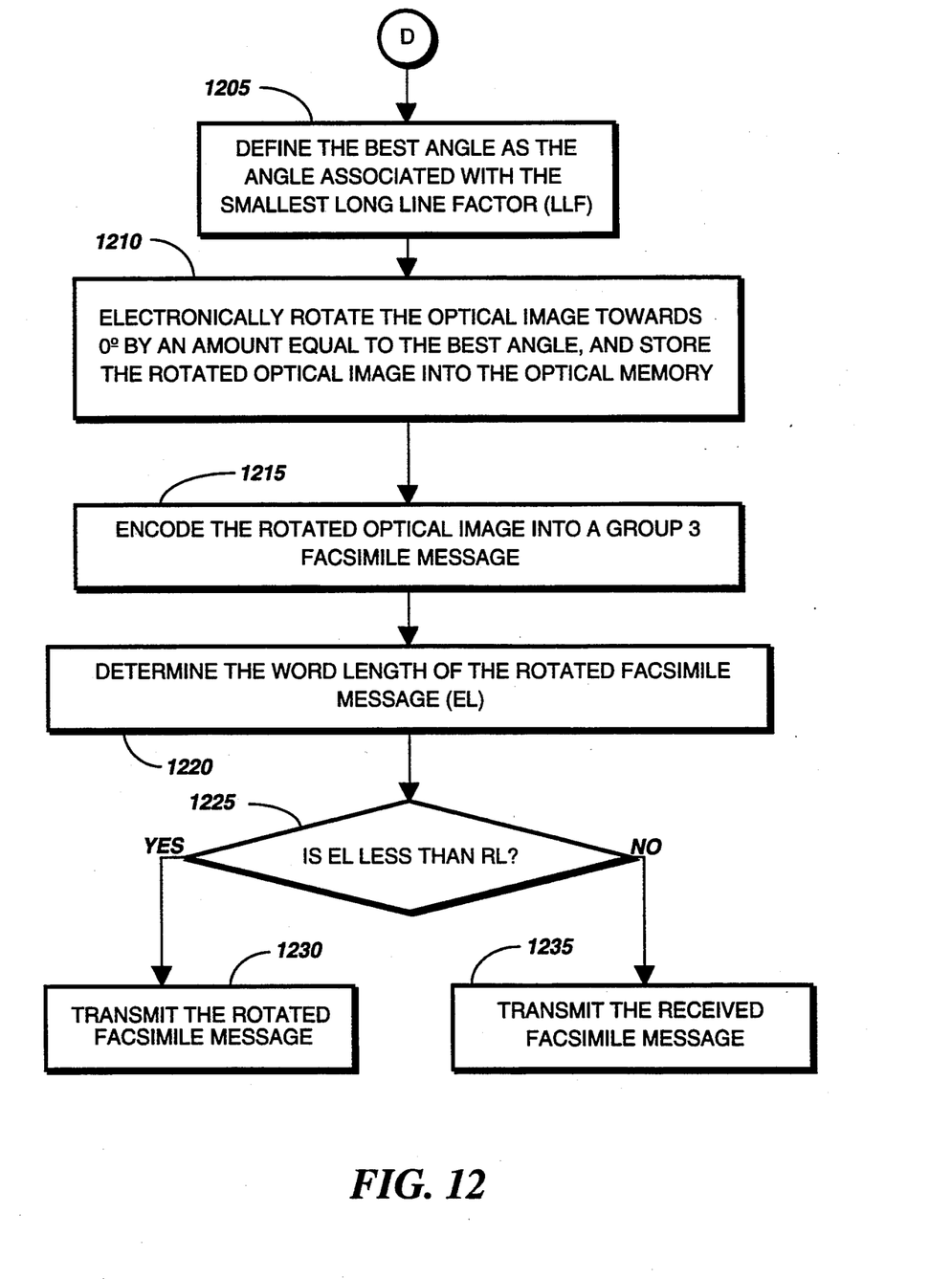

Referring now to FIG. 10, FIG. 11 and FIG. 12, a method for generating and transmitting a compressed facsimile message in the radio communication system of FIG. 1 is shown in flow charts, in accordance with the preferred embodiment of the present invention. At step 1005 of FIG. 10, a facsimile message, encoded with standard or enhanced CCITT group 3 or group 4 coding, is received. At step 1010, the word length (byte length) of the received facsimile message is determined, as value RL. The received message is decoded into an optical image having picture elements grouped into scan lines at step 1015, and the optical image is stored into the image memory at step 1020. At step 1025 a first and second angle are initialized to 2.5° and $-2.5°$. At step 1030, long line factors (LLF's) of the optical image are determined at the first and second angles. A method for determining LLF's is described below, with reference to FIG. 13. At step 1035 an LLF of the optical image at a third angle, midway between the first and second angle, is determined. At step 1040 the two smallest LLF's of the LLF's associated with of the first, second, and third angles are determined. At step 1045, an angular difference (AD) of the angles associated with the two smallest LLF's is determined.

Referring to FIG. 11, when the angular difference AD is not less than 0.5°, at step 1105, and when the difference of the two smallest LLF's is not less than 2, at step 1110, and when the LLF associated with the third angle is one of the two smallest LLF's, at step 1115, the angles associated with the two smallest LLF's are redefined to be the first and second angles at step 1125, and the process flow continues at step 1035 of FIG. 10, as described above. When the AD is not less than 0.5°, at step 1105, and when the difference of the two smallest LLF's is not less than 2, at step 1110, and when the LLF associated with the third angle is not one of the two smallest LLF's, at step 1115, the stored optical image is rotated electronically though an angle of 90° and re-stored, and the process flow continues at step 1025 of FIG. 10, as described above.

When the AD is less than 0.5°, at step 1105, or the difference of the two smallest LLF's is less than 2, at step 1110, the process flow continues at step 1205 of FIG. 12. The best angle is defined to be the angle associated with the smallest long line factor, at step 1205. At step 1210, the optical image is electronically rotated by the amount of the best angle, and stored into the image memory 203. At step 1215, the rotated image is encoded into a CCITT group 3 facsimile message. The word length of the facsimile message of the rotated image is determined and defined as value EL at step 1220. When the value of EL is less than the value of RL (that is, the length of the facsimile message of the rotated image is shorter than the length of the received facsimile message), at step 1225, the facsimile message of the rotated image is transmitted to the subscriber device 105 or 106, at step 1230. When the value of EL is not less than the value of RL (that is, the length of the facsimile message of the rotated image is not shorter than the length of the received facsimile message), at step at 1225, the received facsimile message is transmitted to the subscriber device 105 or 106, at step 1235.

It will be appreciated that at step 1215, encoding methods other than the CCITT group 3 code can be used and will typically benefit from the improved orientation typically provided by the present invention.

Figure 13:
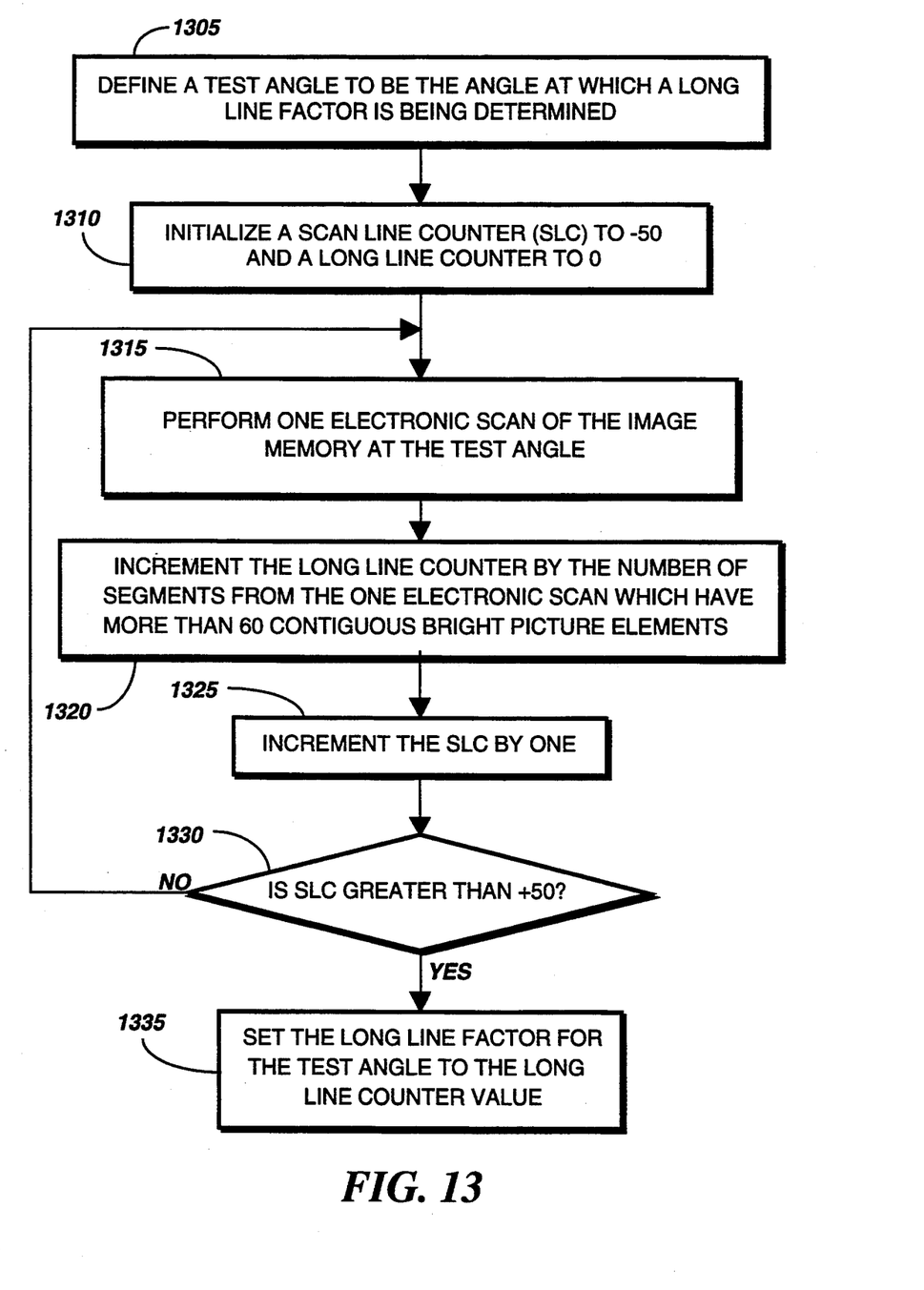
FIG. 13 is a flow chart showing a method for analyzing a portion of an optical image, in accordance with the preferred embodiment of the present invention.

Referring to FIG. 13 a flow chart shows a method for analyzing a portion of an optical image, in accordance with the preferred embodiment of the present invention. When a long line factor is to be determined at an angle, as at step 1030 of FIG. 10, a test angle is defined to have the value of the angle at which the long line factor is to be determined, at step 1305 of FIG. 13. At step 1310, a scan line counter is initialized to a value of $-50$, and a long line counter is initialized to a value of 0. At step 1315, one electronic scan of the optical image stored in the optical memory is performed, in a manner well known to one of ordinary skill in the art, generating a scan line of picture elements. The scan is performed at the test angle, starting at a location in the image memory corresponding to a horizontal position at the left edge of the optical image and a vertical position which is below the center of the left edge of the optical image by the number in the scan line counter, and proceeding through a portion of the image memory as determined by the scan angle and the horizontal and vertical picture element densities of the facsimile message. At step 1320 the long line counter is incremented by a number of long lines as determined from the picture elements scanned at step 1315, wherein a long line is a contiguous segment of more than 60 light picture elements. At step 1325, the scan line counter is incremented by one. When the scan line counter is not greater than $+50$, the process flow continues at step 1315. When the scan line counter is greater than $+50$, one hundred lines have been electronically scanned and the long line factor for the test angle is set to the long line counter value.

It will be appreciated that other methods of deriving a new test angle are possible. For example, a second order polynomial prediction method, well known to one of ordinary skill in the art can be used in many instances to reduce the number of iterations required to determine a more optimum test angle than that derived by using the angle half way between the two angles having the smallest LLF's. Such a method uses an increased number of known LLF's, three in the example using a second order polynomial approach. The method using the second order polynomial is, however, more complicated. Also, when the test angles indicate that the image is significantly rotated, other reorientation angles can be used at step 1120. For example, 5° instead of 90° could be used in systems where documents are likely to have random orientations. The value of the angular difference and the value of the difference of the two smallest LLF's which are used in steps 1105 and 1110 of FIG. 11, which steps determine the continuation of the process, can be other predetermined values, depending on the most probable document sizes, resolutions, and contents. Similarly, the minimum number of contiguous light picture elements in a long line and the number of scan lines used, in steps 1310, 1320, and 1330 of FIG. 13 can be altered depending on the expected content of documents.

It will be further appreciated that the apparatus and method described above will provide facsimile message compression not only on an English text document as used in the examples, but on any document having an image with a strong linear correlation of image elements. This would include documents that are largely, but not necessarily, text of substantially any language, and certain graphical documents. It will be further appreciated that the method will typically provide facsimile message compression in the same manner as described above, when a text (or other type) document, having a substantial amount of information of linear form, is received from an optical scanning during which the document was upside down.

It will be further appreciated that this method and apparatus described above is usable not only in the system controller, but can also be used in the subscriber device 105 or 106 or any radio communication device in the communication system 100 wherein the radio communication device is coupled to a facsimile machine for the transmission of facsimile messages to another subscriber device 105 or 106, or to the facsimile machine 120 or 130.

By now it should be appreciated that there has been provided a method and apparatus which quickly determines an improved orientation of a optical image, resulting in a compress, ed facsimile message for a substantial percentage of documents typically transmitted by facsimile messaging.

We claim:

1. A method for generating a compressed facsimile message, using a controller of a radio communication device, said method comprising the steps of:
   storing an optical image of a scanned document into an image memory;
   analyzing the optical image stored in said storing step at one or more scan angles and generating an associated long line factor for each scan angle analyzed, said analyzing step comprising the steps of:
      scanning a portion of the optical image stored in the image memory at each of the one or more scan angles to detect contiguous groups of light picture elements,
      determining, from the contiguous groups of light picture elements, lengths of light line segments in the portion of the optical image,
      calculating the long line factor as a total quantity of light line segments, each of said light line segments having a length which exceeds a predetermined minimum length, and
      repeating said steps of scanning, determining, and calculating, for each of the one or more scan angles;
   identifying from the associated long line factors generated in said analyzing step, a best scan angle corresponding to one of the one or more scan angles;
   rotating the optical image stored in said storing step to the best scan angle determined in said identifying step to derive an aligned optical image;
   generating the compressed facsimile message by encoding, in a facsimile encoder, the aligned optical image derived in said rotating step; and
   transmitting the compressed facsimile message from a radio frequency transmitter.

2. The method for generating a compressed facsimile message according to claim 1, further comprising the steps of:
   receiving a facsimile message of the scanned document in a message controller; and
   decoding, in a facsimile decoder, the facsimile message received in said receiving step into the optical image of the scanned document comprising binary picture elements grouped in scan lines, each binary picture element representing a light or a dark picture element.

3. The method according to claim 1 wherein the one or more scan angles are initialized at predetermined values.

4. The method according to claim 1 wherein said step of identifying the best scan angle identifies the best scan angle by identifying the long line factor having the lowest value.

5. A method for generating a compressed facsimile message, using a controller of a radio communication device, said method comprising the steps of:
   storing an optical image of a scanned document into an image memory;
   analyzing the optical image stored in said storing step at one or more scan angles and generating an associated long line factor for each scan angle analyzed;
   identifying from the associated long line factors generated in said analyzing step, a best scan angle corresponding to one of the one or more scan angles, said step of identifying the best scan angle further comprising the steps of:
      comparing the one or more long line factors generated in said analyzing step with a predetermined continuation criteria;
      redefining the one or more scan angles when the long line factors meet the continuation criteria in said comparison step;
      repeating said step of analyzing the one or more scan angles using the one or more redefined scan angles when the long line factors meet the continuation criteria in said comparison step; and
      repeating said step of rotating when the long line factors do not meet the continuation criteria in said comparing step;
   rotating the optical image stored in said storing step to the best scan angle determined in said identifying step to derive an aligned optical image;
   generating the compressed facsimile message by encoding, in a facsimile encoder, the aligned optical image derived in said rotating step; and
   transmitting the compressed facsimile message from a radio frequency transmitter.

6. The method according to claim 5 wherein the predetermined continuation criteria is an angular value, further comprising the steps of:
   calculating the angular difference between the angles associated with the smallest two long line factors; and
   comparing the difference between the angles associated with the smallest two long line factors to the predetermined angular value.

7. The method according to claim 5 wherein the predetermined continuation criteria is an integral value, further comprising the steps of:
calculating the difference between the smallest two long line factors; and
comparing the difference between the smallest two long line factors to the predetermined integral value.

8. The method according to claim 5, wherein said step of redefining further comprises the steps of:
selecting two of the plurality of long line factors having the lowest values;
determining a new scan angle from the average of the scan angles associated with the long line factors selected in said step of selecting two long line factors; and
identifying the two angles, associated with the two long line factors selected in said step of selecting two long line factors, and the new scan angle as the one or more scan angles.

9. The method according to claim 5, wherein said step of redefining further comprises the steps of:
selecting three of the long line factors having the lowest value;
determining a new scan angle using the three long line factors and associated scan angles selected in said selecting step using a polynomial prediction formula; and
identifying the three angles associated with the three long line factors selected in said step of selecting three long lines and the new scan angle as the one or more angles.

10. A system controller for generating a compressed facsimile message in radio communication systems, comprising:
an image memory for storing an optical image;
means for image analysis, coupled to said image memory, for analyzing a portion of the stored optical image at a one or more scan angles for generating a long line analysis using a scan angle, said means for image analysis comprising:
scanning means for scanning a portion of the stored optical image at each of the one or more angles to detect contiguous groups of light picture elements,
determining means for determining, from the contiguous groups of light picture elements, lengths of light line segments in the portion of the stored optical image, and
calculating means for calculating the long line factor as a total quantity of light line segments, each of said light line segments having a length which exceeds a predetermined minimum length;
means for best scan angle identification, coupled to said image analysis means, for identifying a best scan angle from one or more image analyses generated by said image analysis means;
an image rotator, coupled to said best scan angle analysis means and said image memory, for generating an aligned optical image by using the stored optical image and the best scan angle; and
a facsimile encoder, coupled to the image memory, for generating the compressed facsimile message from the aligned optical image.

11. The system controller according to claim 10, wherein a facsimile message including an encoded optical image is received, and wherein the system controller further comprises:

a message controller for receiving the facsimile message; and
a facsimile decoder coupled to said message controller for decoding the facsimile message to generate the optical image, and further coupled to said image memory for storing the optical image therein.

12. The system controller according to claim 10, wherein said means for best scan angle identification finds the smallest long line factor using long line factors generated by said means for image analysis.

13. The system controller according to claim 10, wherein said means for best scan angle identification further generates a predetermined angle and said image rotator rotates the stored optical image by the predetermined angle when the long line factors meet a predetermined rotation criteria.

14. A system controller for generating a compressed facsimile message in radio communication systems, comprising:
an image memory for storing an optical image;
means for image analysis, coupled to said image memory, for analyzing a portion of the stored optical image at a one or more scan angles for generating a long line analysis using a scan angle;
means for best scan angle identification, coupled to said image analysis means, for identifying a best scan angle from one or more image analyses generated by said image analysis means, wherein said means for best scan angle identification compares one or more of the long line factors with a predetermined continuation criteria and redefines the one or more scan angles when the long line factors meet the continuation criteria;
an image rotator, coupled to said best scan angle analysis means and said image memory, for generating an aligned optical image by using the stored optical image and the best scan angle; and
a facsimile encoder, coupled to the image memory, for generating the compressed facsimile message from the aligned optical image.

15. The system controller according to claim 14, wherein the continuation criteria is based on the angular difference between the angles associated with the smallest two of the long line factors.

16. The system controller according to claim 14, wherein the continuation criteria is based on the difference between the smallest two of the long line factors.

17. A method for generating a compressed facsimile message, using a controller of a radio communication device, said method comprising the steps of:
receiving a facsimile message of a scanned document at a message controller;
decoding, in a facsimile decoder, the facsimile message received in said receiving step to generate an optical image of the scanned document comprising binary picture elements grouped in scan lines, each binary picture element representing a light or a dark picture element;
storing the optical image of the scanned document in an image memory;
analyzing the optical image stored in said storing step at one or more scan angles and generating an associated long line factor for each scan angle analyzed, said analyzing step further comprising the steps of;
scanning a portion of the optical image stored in the image memory at each of the one or more scan angles to detect contiguous groups of light picture elements, determining, from the contiguous groups of light picture elements, lengths of light line segments in the portion of the optical image, calculating the long line factor as a total quantity of the light line segments, each of said light line segments having a length exceeding a predetermined minimum length, and repeating said steps of scanning, determining, and calculating, for each of the one or more scan angles, identifying from the associated long line factors generated in said analyzing step, a best scan angle corresponding to one of the one or more scan angles, said identifying step further comprising the steps of;

comparing the one or more long line factors generated in said analyzing step with a predetermined continuation criteria, redefining the one or more scan angles when the long line factors meet the continuation criteria in said comparison step, repeating said step of analyzing the one or more scan angles using the one or more redefined scan angles when the long line factors meet the continuation criteria in said comparison step, and repeating said step of rotating when the long line factors do not meet the continuation criteria in said comparing step, rotating the optical image stored in said storing step to the best scan angle determined in said identifying step to derive an aligned optical image;

generating the compressed facsimile message by encoding, in a facsimile encoder, the aligned optical image derived in said rotating step; and transmitting the compressed facsimile message from a radio frequency transmitter.

* * * * *